United States Patent Office 3,639,363
Patented Feb. 1, 1972

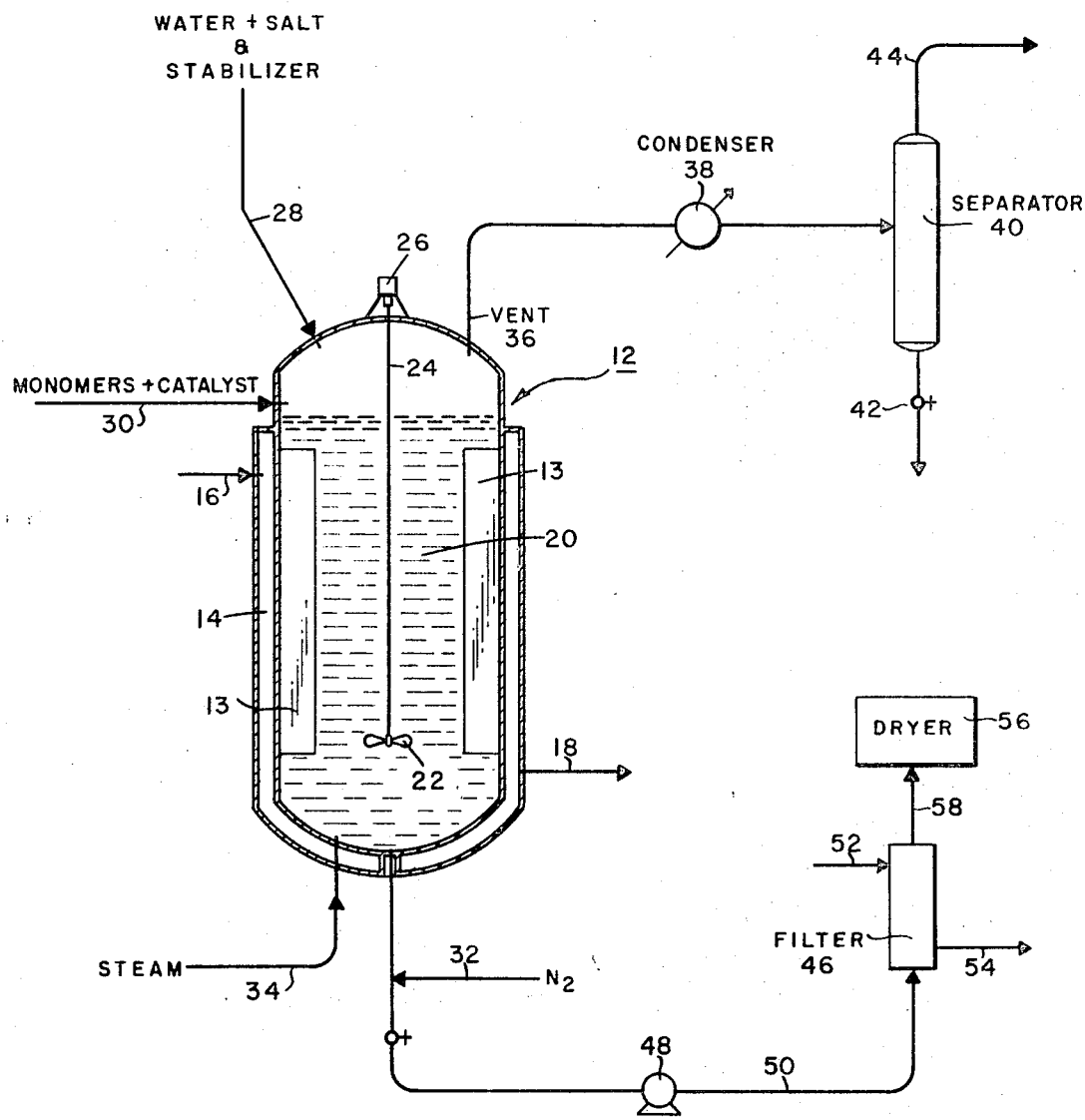

3,639,363
REMOVAL OF 5-ETHYL-2-METHYLPYRIDINE FROM PYRIDINE POLYMERS
Richard A. Marshall, Baytown, Tex., assignor to Esso Research and Engineering Company
Filed Mar. 13, 1968, Ser. No. 712,791
Int. Cl. C08f 7/12, 13/02
U.S. Cl. 260—80.3
8 Claims

ABSTRACT OF THE DISCLOSURE

The process of removing 5-ethyl - 2 - methylpyridine from an aqueous reaction mixture containing polymers produced at least from 2 - methyl - 5 - vinylpyridine monomer wherein a portion of the mixture is vaporized after polymerization effective to remove the 5-ethyl-2-methylpyridine, such as by passing steam through it, and the vapor containing the 5-ethyl - 2 - methylpyridine is withdrawn from the reaction mixture. The polymer, substantially free of 5-ethyl - 2 - methylpyridine, is then separated from the remaining reaction solution and dried to a free-flowing product.

BACKGROUND OF THE INVENTION

Field of the invention

This invention is directed to new methods of producing dye receptor polymer from at least 2-methyl-5-vinylpyridine monomer. More particularly, it relates to the treatment of such polymers contaminated with small amounts of 5-ethyl - 2 - methylpyridine to remove the 5-ethyl-2-methylpyridine therefrom. In a specific aspect, steam distillation is employed to remove 5-ethyl-2-methylpyridine from an aqueous polymerization reaction medium after termination of polymerization.

Description of the prior art

Polymers of various vinyl substituted mono and polycyclic pyridine bases are added to hydrocarbon polymers such as polypropylene in order to make them receptive to dyes. As used with such bases herein, the term "polymer" includes homopolymers of such bases, copolymers of one such base with another such base or with polymerizable olefinic monomers such as styrene or 1,3-butadiene, or graft copolymers of such bases onto solid polymers like polyethylene, polypropylene, polybutadiene, or polystyrene.

A common component of such polymers is 2-methyl-5-vinylpyridine monomer, which is prepared by dehydrogenating 5-ethyl - 2 - methylpyridine. Because the boiling point of 2-methyl - 5 - vinylpyridine is very close to that of its precursor, distillation of the product does not completely separate it from unreacted 5-ethyl-2-methylpyridine. Consequently, commercially available 2-methyl-5 - vinylpyridine contains small amounts of 5 - ethyl-2-methylpyridine, ranging from about 0.8% to 6% or more based on the weight of 2-methyl - 5 - vinylpyridine, and these amounts are introduced into polymerization reaction mixtures employing 2 - methyl - 5 - vinylpyridine monomer.

Because 5-ethyl - 2 - methylpyridine contains no ethylenically unsaturated group, it is an inert ingredient of polymerization reaction mixtures that include 2-methyl-5-vinylpyridine, and when polymerization of the active ingredients is complete, it remains to contaminate the polymer product. Such polymers have severe processing disadvantages. Not only does 5-ethyl-2-methylpyridine have a very bad odor that makes it obnoxious to process the polymer, more importantly, the presence of 5-ethyl-2-methylpyridine makes the processing of such polymers unnecessarily hazardous. The toxicity of 5-ethyl-2-methylpyridine is well known. (For example, see F. A. Patty, "Heterocyclic and Miscellaneous Nitrogen Compounds," Interscience Publishers, Inc., New York (1962), pp. 2181–2193.) In some instances in which such polymers have been blended with hydrocarbon polymers like polypropylene and the blend melt-spun into fibers, the high operating temperatures have vaporized 5-ethyl - 2 - methylpyridine entrapped in the dye receptor polymer to produce atmospheric levels of the toxic 5-ethyl-2-methylpyridine about the melt spinning apparatus that materially exceeded physiologically safe limits.

Aside from giving polymers that it contaminates a bad odor and compromising the safety of those who use the product in high temperature applications, the presence of 5 - ethyl - 2 - methylpyridine makes it discouragingly difficult, if not impossible, to prepare a good free-flowing pellitized polymer product. This is because the 5-ethyl-2-methylpyridine also serves as a plasticizing agent in the polymer, thereby lowering its softening point. Consequently, if the softening point of the plasticized polymer is exceeded during polymer drying operations, severe— even massive—caking of the polymer results. Thus, quite commonly, commercially available polyvinylpyridine copolymer not only carries the bad odor of 5-ethyl-2-methylpyridine, but gives evidence of having been prepared in lumps which subsequently were crushed.

Specific prior art considered in connection with the present invention includes U.S. Pat. 3,315,014.

SUMMARY OF THE INVENTION

In a significant development which eliminates the problems brought on by 5-ethyl-2-methylpyridine contamination of dye receptor polymer produced at least from 2-methyl-5-vinylpyridine monomer, it has been discovered that 5-ethyl - 2 - methylpyridine can be removed from the aqueous reaction mixture on completion of polymerization and before filtration and drying of the solid polymer by vaporizing the mixture for a length of time effective to substantially remove the 5-ethyl - 2 - methylpyridine from the mixture and withdrawing the vaporized 5-ethyl - 2 - methylpyridine therefrom. The dye receptor polymer recovered from the polymerization mixture treated in this manner is found to be free of the processing and product maladies that plague polymer contaminated with 5-ethyl-2-methylpyridine. Thus, free-flowing, odor-free pellets of copolymer can be obtained in the drying step instead of malodorous agglomerated lumps. Further, the contaminant-free polymer can be processed safely by the processor.

BRIEF DESCRIPTION OF THE DRAWING

The single figure of the accompanying drawing is a flow diagram that schematically illustrates the present invention.

DESCRIPTION OF THE PREFERRED EMBODIMENTS

A more complete understanding of the present invention and a fuller appreciation of the advantages thereof may be gained from the following description of preferred modes of practicing the invention, taken in conjunction with the accompanying drawing.

And now referring to the drawing, there is illustrated one form of practicing the method of the present invention for removing 5-ethyl-2-methylpyridine from dye receptor polymer. Reference numeral 12 designates a tubular reactor provided with vertically disposed baffles 13 and a jacket 14 through which a temperature regulating medium ma be circulated by way of lines 16 and 18.

The temperature reacting medium may suitably be a mixture of steam and water, or a commercial medium such as Dowtherm liquid, a mixture of biphenyl and biphenyl ether, or the like, and is employed to maintain a temperature in the reaction zone 20 within the range of 50° C. to 100° C. in the liquid phase, but preferably, at 71–77° C., and desirably at 74° C. An agitating or propelling means 22 on driving shaft 24 protrudes into the reaction zone 20 and is driven by a power means 26, which suitably may be an electric motor and the like.

Introduced into the reaction zone 20 by way of line 28 is an aqueous solution comprised of water, an inorganic salt, and a suitable surfactant. Incoming by way of line 30 is a monomer charge of vinyl substituted mono and/or polycyclic pyridine bases comprised of at least 2-methyl-5-vinylpyridine. When copolymers are to be prepared, the monomer charge preferably consists of 2-vinylpyridine and 2-methyl-5-vinylpyridine. Minor amounts of 5-ethyl-2-methylpyridine contaminate the 2-methyl-5-vinylpyridine of the charge. A free radical producing catalyst is introduced as a solution in the monomer charge, and may be one of the well-known azo catalysts or peroxy catalysts, or the like. In the reaction zone 20, the monomers of the monomer charge are polymerized to form solid polymer which may have an intrinsic viscosity, as measured in pyridine at 30° C., in the range of about 0.6 to about 1.1, and preferably within the range of 0.7 to 0.9, desirably 0.8, when the product is a 1:1 copolymer of 2-vinylpyridine and 2-methyl-5-vinylpyridine.

The tubular reactor zone 20 is under pressure sufficient to maintain the liquid reaction temperature at the range previously indicated. This pressure may be within the range of about 0 to about 20 p.s.i.g. The mixture is held at the previously stated reaction temperature for at least 30 minutes, but preferably for about 3 hours. During this time stirring speed is selected to maintain the suspension and to provide proper particle size. Too slow stirring causes the suspension to fail, and stirring too fast increases the amount of "fines" or dust in the product. The reaction time may be that which it takes the reaction to run to exhaustion of monomer or may be determined by using a free radical trap, such as 2,6-di-tert-butyl-p-cresol, or the like, to arrest the formation of radicals from further decomposition in the catalyst and to terminate polymerization. During polymerization, nitrogen gas is flowed into the reactor by line 32 to provide a nitrogen blanket therein. This excludes atmospheric oxygen which can form into peroxy radicals during the course of polymerization.

It has previously been mention that the 2-methyl-5-vinylpyridine introduced into the reactor contains minor amounts of 5-ethyl-2-methylpyridine. Since the 5-ethyl-2-methylpyridine does not polymerize during the reaction, it is still present in the reaction medium after polymerization of monomer has completed. In accordance with the present invention, when polymerization has terminated, the 5-ethyl-2-methylpyridine is removed from the aqueous reaction mixture by vaporizing at least a portion of the mixture for a length of time effective to substantially remove therefrom the 5-ethyl-2-methylpyridine and, at the same time, venting the vapor comprised of 5-ethyl-2-methylpyridine from the reactor for discarding or collecting. Of course, water will also comprise part of the vapor.

In the illustrated form of the invention, inlet line 34 passes steam into the reaction mixture to heat the aqueous mixture to boiling to distill the aqueous mixture containing 5-ethyl-2-methylpyridine until the 5-ethyl-2-methylpyridine has effectively boiled from solution, at which time the boiling point of the azeotropic mixture will rise to that of the mixture without material amounts of 5-ethyl-2-methylpyridine. In most runs it has been found that vaporization of 25% by volume of the aqueous reaction mixture is effective to remove substantially all of the 5-ethyl-2-methylpyridine from the aqueous solution. Thus, removal is obtained by vaporizing only a minor amount of the aqueous mixture.

The vaporized reaction mixture containing 5-ethyl-2-methylpyridine is vented from the reactor zone 20 by conduit line 36, which conducts it to a condensor 38 without causing a change in composition of the vapor. The vapor is cooled at condenser 38 to cause it to condense into a two-phase condensate in a separator-receiver 40 connected to condensor 38. Since 5-ethyl-2-methylpyridine is oily and insoluble in water, the condensate may be allowed to separate and the aqueous phase thereof drained from the receiver by way of valvecock 42. The oily 5-ethyl-2-methylpyridine may be collected by way of line 44 for reuse, such as by dehydrogenation to produce further 2-methyl-5-vinylpyridine.

The 5-ethyl-2-methylpyridine distillation step is followed by filtration of the reaction mixture to recover solid polymer. The reaction mixture is pumped to filler means 46 by pump 48 through line 50. Filter means 46 may be any suitable means known to the art. It has been found that a simple 200-mesh screen is adequate to separate solid polymers from the remainder of the aqueous reaction medium. Residual salts and suspension stabilizers are removed from the product by water wash flowed by way of lines 52 and 54.

Following filtration, the filtered solids are dried to recover polymer product free of 5-ethyl-2-methylpyridine. The materials are transferred to a suitable dryer 56, which may be a vacuum tumble dryer, by way of conveyor 58. Drying should be sufficient to provide a product containing less than about 1% of water. Flash dryers provide an alternative drying method. The resultant dried product, substantially free of 5-ethyl-2-methylpyridine contamination, bears no bad odor, does not tend to agglomerate, and is free-flowing.

OPERATING CONDITIONS

The monomer feed charged to the reactor of the illustrated embodiment comprises 2-methyl-5-vinylpyridine containing minor amounts of 5-ethyl-2-methylpyridine contaminant and may suitably include such vinyl substituted monocyclic pyridine monomers and alkyl substituted monomers as 3-vinylpyridine, 4-vinylpyridine. 5-ethyl-2-vinylpyridine, 2-methyl-6-vinylpyridine, 2,4-dimethyl-6-vinylpyridine, and 5-propyl-2-vinylpyridine, or a mixture thereof. Other suitable monomer charge in addition to 2-methyl-5-vinylpyridine may be vinyl substituted polycyclic pyridines, for example, 2-vinylquinoline and 4-vinylquinoline. The polymer which results from polymerization of the monomers may be either a homopolymer of 2-methyl-5-vinylpyridine monomer, or a copolymer of 2-methyl-5-vinylpyridine and a vinyl pyridine or a vinyl quinoline monomer.

The reactions may be catalyzed with a wide variety of free radical producing substances, preferably those which are oil-soluble in the monomers for the aqueous suspension polymerization method employed. Suitable examples of such compounds are benzoyl peroxide, cumyl peroxide, t-butylhydroperoxide, di-t-butylperoxide, and other peroxy acids and hydroperoxides. The azo catalysts are also satisfactory for the production of the dye receptor polymers and are preferred. Azo catalysts which may be employed are azo-N,N'-bisisobutyronitrile, dimethyl-N,N'-azodiisobutyrate, N,N'-azo-bis(2,4-dimethyl valeronitrile), and N,N'-azodiisobutyramide.

Suspension stabilizers which may be employed are those compounds which have both a hydrophilic and a hydrophobic radical. Suitable compounds include the common soaps, such as sodium stearate and other alkali metal salts of high molecular weight, carboxylic acids and mixtures thereof, obtained by the saponification of animal and vegetable fats, the salts of sulfonated hydrocarbons, for example, the alkali metal salts of sulfonated paraffins, sulfonated napthalenes, and sulfonated alkyl benzenes, the salts of formaldehyde condensed in sulfonic acids, the sodium salts of formaldehyde-condensed alkyl aryl sulfonic salts, the salts of triethanolamine and other amino soaps, and alkali salts of sulfonic half esters of fatty alcohols.

Inorganic salts, which are empolyed to increase the ionic strength of the aqueous medium and thus control the solubility of the catalyst, monomer, and stabilizer in the aqueous suspension medium, may suitably be sodium sulfate or potassium sulfate, or the like.

Temperatures employed may range from about 50° to about 100° C., depending upon the monomer charge and water volume. With 2-vinylpyridine and 2-methyl-5-vinylpyridine and water, a preferred polymerization temperature of 74±3° C. may be used.

Pressures employed in the polymerization may be pressures sufficient to maintain a liquid phase under polymerization temperatures. A suitable pressure for a 2-vinylpyridine and 2-methyl-5-vinylpyridine charge at 74° C. is one atmosphere.

In the vaporization of 5-ethyl-2-methylpyridine from the aqueous reaction mixture after polymerization and before filtration of solid polymer, the reaction mixture is heated to temperatures ranging from those comprising the boiling points of the aqueous reaction mixture as it contains 5-ethyl-2-methylpyridine to the boiling points of the reaction mixture after 5-ethyl-2-methylpyridine has boiled substantially out of solution, leaving only immaterial or trace amounts of 5-ethyl-2-methylpyridine therein. At one atmosphere of pressure, it has been found that 5-ethyl-2-methylpyridine can be effectively removed from the reaction mixture by heating the mixture at temperatures of from 97° to 100° C. Obviously, pressures greater than one atmosphere will result in a rise in temperature range above that just indicated, and conversely, a reduction of pressure to less than one atmosphere will result in a fall in the temperature range effective to bring the aqueous reaction mixture containing 5-ethyl-2-methylpyridine to a boil. Practical pressure ranges may thus extend from about 0.01 to 3.0 atmospheres. Pressure reduction may effectively be used in combination with a passage of a current of inert gas, such as $N_2$, through the reaction mixture to effect boiling at lower temperatures.

The present invention is further illustrated by the following examples wherein all proportions are expressed by weight unless otherwise indicated. The results of the examples are summarized in Table 1.

EXAMPLE I

In runs 1 and 2, a monomer charge of 52.5 parts of 2-vinylpyridine and 59.5 parts of 2-methyl-5-vinylpyridine was introduced into a reactor with 400 parts of deaerated water, 5–6 parts of sodium sulfate, 1–2 parts of a sodium salt of an alkyl naphthalene sulfonic acid, and 1 part of azo-N,N'-bisisobutyronitrile. The reactor was heated to a temperature of 74±3° C. and the mixture held at this temperature for 3 hours at about one atmosphere of pressure under a nitrogen blanket. The polymerization was terminated with the addition of 0.5 parts of 2,6-bis(4-hydroxy-3,5-di-t-butylphenoxy)-4-octyl-5-triazine to arrest the formation of radicals from further decomposition of the catalyst and to terminate any remaining polymer radicals.

Steam was then passed into the reaction mixture and 15–25% of the reaction medium steam-distilled. 5-ethyl-2-methylpyridine first began to vaporize at about 97° C. and continued to vaporize until temperatures of about 100° C. were reached. The two-phase distillate was collected for separation of the 5-ethyl-2-methylpyridine for further use.

Following steam distillation, the reaction mixture was filtered with a sintered glass Buchner funnel and residual salts and suspension stabilizer were removed from the product by water-wash. Thereafter, the filtered solids were dried in a vacuum oven at 70° C. under 75 mm. Hg pressure to contain less than 1% of water. Intrinsic viscosities and yields of the polymer are shown in Table 1.

TABLE 1.—STEAM TREATMENT OF SUSPENSION POLYMERIZED PVP

| Run Number | Weight (parts) | Yield[b] (percent) | $[\eta]25°$ MeOH | $[\eta]30°$ Py[c] | Steam condensate (vol.) | Steam distillate[a] Weight (parts) | Yield[b] (percent) |
|---|---|---|---|---|---|---|---|
| 1 | 96.0 | 86 | 0.98 | 0.79 | 100 | 1.1 | 1.0 |
| 2 | 106.4 | 95 | 1.15 | 0.91 | 100 | 2.0 | 1.8 |
| 3 | 97.9 | 87 | 1.10 | 0.88 | 100 | | |
| 4 | 97.3 | 87 | 1.11 | 0.89 | 100 | 1.2 | 1.1 |

[a] The steam distillate was isolated by extracting the condensate three times with 60–40 ether-benzene, drying the combined extracts over potassium carbonate, and evaporating the solvent.
[b] Based on monomer charged (52.5 parts of VP, 59.5 parts of MVP).
[c] Calculated from $[\eta]25°$ MeOH.

The recovered polyvinylpyridine solid product was found to be free-flowing, colorless, and odor free. Infrared, nuclear magnetic resonance, and gas chromatographic analyses showed that the major constituent of the distillate was 5-ethyl-2-methylpyridine. No 2-vinylpyridine was detected and only a trace of 2-methyl-5-vinylpyridine was sensed in the distillate. Based on monomer charged, a yield percent of 1% was obtained in one run, and 1.8% was obtained in another run, as may be seen by reference to Table 1.

EXAMPLE II

Same as Example I except that in runs 3 and 4 (see Table 1) the reaction was heated to boiling by means of an electrically heated mantle. As in Example I, infrared, nuclear magnetic resonance, and gas chromatographic analyses showed the major constituent of the distillate to be 5-ethyl-2-methylpyridine based on monomer charged, as seen in Table 1. There was no 2-vinylpyridine but a trace of 2-methyl-5-vinylpyridine was in the distillate.

EXAMPLE III

Same as Example II except that an inert gas, such as $N_2$, is passed through the reaction mixture to cause it to boil at a lower temperature.

EXAMPLE IV

Same as Example III except that a vacuum is applied to the reactor.

EXAMPLE V

Same as Example III except that several thousand pounds of the copolymer were prepared in a 500-gallon reactor with an 18–20 inch double pitch blade turbine stirrer. Stirrer speeds of 120–150 r.p.m. were used. The monomer charged in each run was 750 pounds.

Having fully described the best modes and embodiments of the present invention, it is to be understood that the present invention is not limited to the specific details set forth, but is of the full scope of the appended claims.

What is claimed is:
1. In the process of producing a vinylpyridine base polymer wherein a vinylpyridine base monomer comprising at least 2-methyl-5-vinylpyridine contaminated with up to 6 weight percent of 5-ethyl-2-methylpyridine, based on the 2-methyl-5-vinylpyridine, is polymerized in an aqueous suspension in the presence of a free radical producing catalyst, and wherein an aqueous mixture is ob- tained at the termination of polymerization which includes said 5-ethyl-2-methylpyridine and polymers of said vinylpyridine base, the improvement which comprises:

vaporizing and withdrawing up to about 25 weight percent of said aqueous mixture effective to substantially remove said 5-ethyl-2-methylpyridine from said mixture.

2. The method of claim 1 wherein the vaporization is accomplished by heating said aqueous mixture to temperatures from those comprising the boiling points of said aqueous mixture containing 5-ethyl-2-methylpyridine to that of the boiling point of such mixture without material amounts of 5-ethyl-2-methylpyridine.

3. The method of claim 1 wherein said aqueous mixture is vaporized by heating it to temperatures of from about 97–100° C. at about one atmosphere of pressure.

4. The method of claim 1 in which said aqueous mixture is vaporized by heating it at pressures ranging from 0.01 to 3 atmospheres.

5. The method of claim 1 in which said aqueous mixture is vaporized by passing steam through said mixture.

6. The method of claim 1 wherein steam is passed through said aqueous mixture to heat said mixture to temperatures ranging from about 97–100° C. at pressures from about 0.01 to 3 atmospheres to vaporize up to 25% by volume of said mixture.

7. The method of claim 1 wherein the following said removal of 5-ethyl-2-methylpyridine from said aqueous mixture, the aqueous mixture is filtered and filtered solids are dried to recover the polymer product.

8. In the method of producing polyvinylpyridine copolymer wherein 2-vinylpyridine monomer and 2-methyl-5-vinylpyridine monomer contaminated with up to 6 weight percent of 5-ethyl-2-methylpyridine, based on the 2-methyl-5-vinylpyridine, are admixed in water with a surface-active agent and an inorganic salt in the presence of a free radical producing catalyst to form an aqueous suspension, and are allowed to polymerize in a reactor for a period of least 30 minutes at temperatures of from 50° C. to 100° C., following which the resultant aqueous mixture is filtered and filtered solids are dried to recover the copolymer product, the improvement which comprises:

vaporizing and withdrawing up to 25 volume percent of said aqueous mixture after said period and before filtration by passing steam through said aqueous mixture for a length of time effective to remove said 5-ethyl-2-methylpyridine from said aqueous mixture.

References Cited
UNITED STATES PATENTS

| | | | |
|---|---|---|---|
| 2,491,472 | 12/1949 | Harmon | 260—88.3 |
| 2,728,770 | 12/1955 | Mahan | 260—88.3 |
| 2,555,939 | 6/1951 | Sherwin | 260—93.5 A |
| 2,822,356 | 2/1958 | Crane | 260—93.5 A |

HARRY WONG, JR., Primary Examiner

U.S. Cl. X.R.

260—30.2, 80.72, 88.3 887, 897